United States Patent [19]

Foreman et al.

[11] Patent Number: 4,482,290

[45] Date of Patent: Nov. 13, 1984

[54] DIFFUSER FOR AUGMENTING A WIND TURBINE

[75] Inventors: Kenneth M. Foreman, North Bellmore; Barry L. Gilbert, Westbury, both of N.Y.

[73] Assignee: The United States of America as represented by the United States Department of Energy, Washington, D.C.

[21] Appl. No.: 471,567

[22] Filed: Mar. 2, 1983

[51] Int. Cl.³ ............................................. F03D 1/04
[52] U.S. Cl. .................................. 415/2 A; 415/207; 415/209; 415/DIG. 1
[58] Field of Search .................................. 415/2A–4A, 415/207–210, DIG. 1

[56] References Cited

U.S. PATENT DOCUMENTS

| | | | |
|---|---|---|---|
| 1,578,923 | 3/1926 | Schlotter | 415/4 A X |
| 2,017,961 | 10/1935 | Ferral | 415/3 A X |
| 4,021,135 | 5/1977 | Pedersen et al. | 415/209 X |
| 4,075,500 | 2/1978 | Oman et al. | 415/2 A X |
| 4,087,196 | 5/1978 | Kronmiller | 415/3 A X |
| 4,132,499 | 1/1979 | Igra | 415/2 A |
| 4,204,799 | 5/1980 | de Guess | 415/3 A X |
| 4,320,304 | 3/1982 | Karlsson et al. | 415/3 A X |
| 4,324,985 | 4/1982 | Oman | 415/3 A X |
| 4,411,588 | 10/1983 | Currah | 415/4 A X |

FOREIGN PATENT DOCUMENTS

| | | | |
|---|---|---|---|
| 729534 | 12/1942 | Fed. Rep. of Germany | 415/2 A |
| 891697 | 3/1944 | France | 415/2 A |
| 2422047 | 12/1979 | France | 415/3 A |

*Primary Examiner*—Everette A. Powell, Jr.
*Attorney, Agent, or Firm*—Jeannette M. Walder; Walter L. Rees; Michael F. Esposito

[57] ABSTRACT

A diffuser for augmenting a wind turbine having means for energizing the boundary layer at several locations along the diffuser walls is improved by the addition of a short collar extending radially outward from the outlet of the diffuser.

4 Claims, 3 Drawing Figures

DIFFUSER FOR AUGMENTING A WIND TURBINE

CONTRACTURAL ORIGIN OF THE INVENTION

The United States Government has rights in this invention pursuant to Contract No. EY-76-C-02-2616 between the U.S. Department of Energy and Grumman Aerospace Corporation.

BACKGROUND OF THE INVENTION

This invention relates generally to the field of wind energy conversion systems and, more particularly, to an improved diffuser for augmenting a wind turbine.

A diffuser is a passage so shaped (usually in the form of a divergent duct) that it will change the characteristics of a fluid flow from a certain pressure and velocity at the inlet to a lower velocity and higher pressure at the outlet. Generally, the diffusion must be carried out in a well-streamlined passage having smooth interior surfaces, and sides not diverging at so great an angle as to cause the fluid to leave the sides of the diffuser. By reducing the velocity through increasing the cross-sectional area of flow, the pressure may be built up as the velocity head is diminished. Diffusers are used to conserve energy by efficiently converting velocity head into pressure.

Thus the power generating capability of a conventional wind turbine can be increased by installing it at the entrance of a diffuser.

In all energy conversion systems, cost and efficiency are paramount considerations. Early investigations of diffuser augmentation were discouraging because it was believed that diffuser efficiency could only be achieved by the use of a small included angle, implying a long and costly diffuser. Recent advances in diffuser augmentation have relied upon the principle of boundary layer control to permit the use of a shorter length, wide angle diffuser. An example of a diffuser augmented wind turbine using various structures to energize the boundary layer and prevent flow separation from the diffuser walls (the major cause of inefficiency in short, wide angle diffusers) is shown in Oman et al U.S. Pat. No. 4,075,500.

In addition to the aforementioned aerodynamic problems with diffuser augmented wind turbines, there are also important structural considerations. Commercially feasible wind turbines have rotors of the order of 100 feet in diameter and this necessitates a diffuser of comparable size for augmentation. Large diffusers require more material to maintain structural rigidity, adding to the overall weight, and more supports to withstand wind forces impinging on the diffuser. Consequently, effective as boundary layer control devices have been, there is still a need to reduce diffuser length and increase power efficiency (thereby reducing costs) even more.

Therefore, it is an object of the present invention to provide an improved diffuser for augmenting a wind turbine with significantly reduced axial length.

It is also an object of the present invention to provide an improved diffuser that increases power output of a conventional wind turbine.

It is another object of the present invention to provide a diffuser with improved structural rigidity and stability.

Other objects and advantages will become apparent from the description set forth hereafter.

SUMMARY OF THE INVENTION

The present invention employs a short collar extending radially outward from the outlet of the diffuser positioned at least perpendicular to the axis of the diffuser or slightly into the direction of wind flow. The collar can also be described as a divergent duct section having an included angle of at least substantially 180°. The free wind flowing over the collar produces a region of low pressure immediately downstream of the collar. This low pressure zone acts as a natural peripheral suction to attract the internal flow and effect its rapid expansion to the full diameter of the collar. The sudden and abrupt change of cross-sectional area provided by the outer diameter of the collar establishes for the internal flow a rapid change of flow conditions tantamount to a diffusional process.

To achieve the foregoing and other objects, a diffuser for augmenting a wind turbine having means for energizing the boundary layer at several locations along the diffuser walls is improved by the addition of a collar positioned at least perpendicular to the axis of the diffuser and connected to the outlet of the diffuser.

DESCRIPTION OF THE DRAWINGS

The present invention is illustrated in the accompanying drawings wherein.

DETAILED DESCRIPTION OF THE INVENTION

Figure 1:
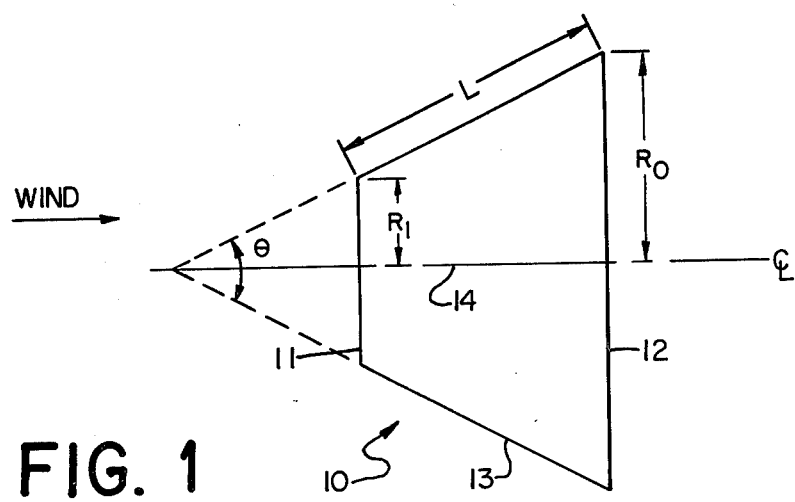
FIG. 1 is a diagrammatic view of a cross-section of a divergent duct.

FIG. 1 shows a diagrammatic cross-section of divergent duct 10 with inlet 11 having radius $R_I$ and outlet 12 having radius $R_o$. Divergent duct 10 is defined by included angle $\theta$, wall 13 having length L and axis 14. When $\theta = 180°$, wall 13 is perpendicular to axis 14 (the configuration of the collar). In operation, wind enters inlet 11 and diffuses as it reaches outlet 12.

Figure 2:
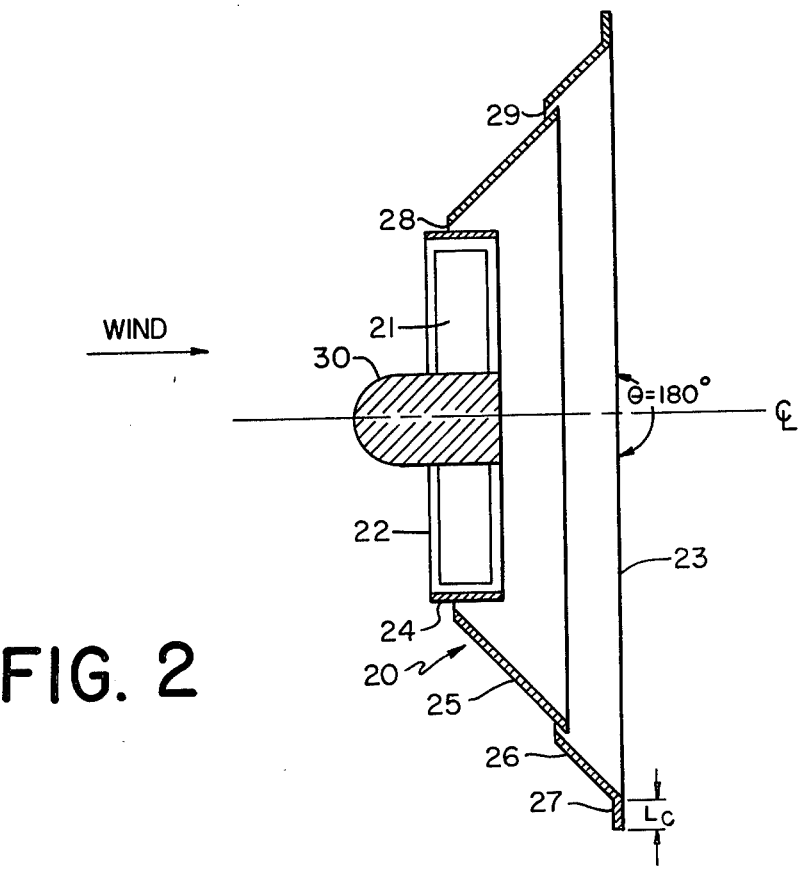
FIG. 2 is a cross-section of a diffuser augmented wind turbine with a centerbody.

The improved diffuser 20 for augmenting a wind turbine as shown in FIG. 2 includes three sections: cylindrical section 24, first divergent section 25 and second divergent section 26. Collar 27 (a divergent duct section with $\theta = 180°$) is connected to second divergent section 26 at diffuser outlet 23. First divergent section 25 is positioned downstream and outside of cylindrical section 24. Circumferential slots 28 are formed in the spaces between sections 24 and 25, sections 24 and 25 being supported relative to one another by struts 32 (shown in FIG. 3). Similarly, second divergent section 26 is positioned downstream and outside of first divergent section 25. Circumferential slots 29 are formed in the spaces between section 25 and 26, sections 25 and 26 being supported relative to one another by struts 31 (shown in FIG. 3). Circumferential slots 28 and 29 provide free wind flow to suppress internal flow separation in the highly divergent duct sections 25 and 26 (i.e. they act as boundary layer control devices). Wind turbine 21 is positioned within cylindrical section 24. The improved diffuser 20 is further enhanced by the presence of centerbody 30 which supports wind turbine 21 and is positioned within cylindrical section 24. It has been found that the shape of the upstream portion of centerbody 30 is not critical to the operation of the improved turbine, but that the downstream face should be flat and blunt immediately downstream of wind turbine 21. In operation, wind enters the diffuser 20 at inlet 22 and is diffused until it leaves at outlet 23.

Figure 3:
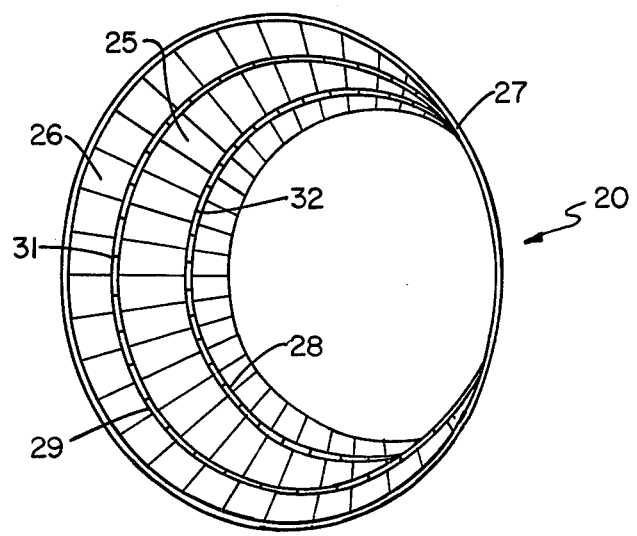
FIG. 3 is a perspective view of the diffuser in FIG. 2 (wind turbine not shown).

Referring to FIG. 3, a perspective view of diffuser 20 without showing wind turbine 21 or centerbody 30, sections 24, 25 and 26 are concentric with respect to each other. Struts 32 are equally spaced between sections 24 and 25, forming equally spaced circumferential slots 28. Similarly struts 31 are equally spaced between sections 25 and 26, forming equally spaced circumferential slots 29.

In FIG. 2, collar 27 is shown as a divergent duct section having included angle $\theta = 180°$ (collar 27 is also described as extending radially outward, being perpendicular to the axis or center line of diffusaer 20). When $\theta > 180°$, collar 27 extends upstream, into the wind. Lc, the radial length of collar 27 is short and may be from 2% to 5% of the radius of outlet 23. In addition to aiding in the diffusional process, collar 27 serves as a useful structural support which stiffens the large diameter duct 26 and prevents it from becoming locally distorted due to side loading or self-loading (weight). Collar 27 can also be used to connect diffuser 20 to a ground plane support structure.

The axial length of diffuser 20 may be from 15% to 100% of the inlet radius. The outlet to inlet area ratio could range between 2–4.

EXAMPLE

In a baseline diffuser with an outlet to inlet area ratio of 2.70 (this corresponds to a diffuser having an included angle of 60°), having primary and secondary boundary layer control slots, axial length equal to inlet radius, the addition of a circumferential collar having radial length equal to 3% of the inlet radius, resulted in overall performance being improved 15.4%, axial length reduced 20%, overall weight reduced 12%, and calculated reductions to busbar costs of energy of 25%. When the diffuser outlet to inlet area ratio is 2.70, the outlet to projected wind turbine area ratio is 2.78. This permits the clearance between the wind turbine (21) and cylindrical section (24) to range between the desired 1.5% to 5% of the wind turbine radius.

The embodiments of this invention in which an exclusive property or privilege is claimed are defined as follows:

1. In a diffuser augmented wind turbine, the diffuser comprising:
   a cylindrical section for positioning the wind turbine therein;
   a first divergent duct section positioned downstream and outside of said cylindrical section and in spaced-relationship with said cylindrical section whereby a circumferential opening is formed in the space therebetween;
   a second divergent duct section positioned downstream and outside of said first section and in spaced-relationship with said first section whereby a circumferential opening is formed in the space therebetween;
   means for connecting said cylindrical section to said first section;
   means for connecting said first section to said second section;
   a short collar connected to the outlet of said second section, positioned at least perpendicular to the diffuser axis and extending radially outward into the external flow;
   wherein the radial length of said collar is from 2% to 5% of the length of the radius of the outlet of said second section; wherein the axial length of the diffuser is equal to the length of the radius of the diffuser inlet; and wherein the ratio of the area of the outlet of said second section to the area of the inlet of said cylindrical section is from 2 to 4.

2. The diffuser augmented wind turbein of claim 1 wherein said first and second sections comprise frustoconical sections.

3. The diffuser augmented wind turbine of claim 2 wherein the ratio of areas is equal to 2.70.

4. The diffuser agumented wind turbine of claim 1 wherein the wind turbine includes a centerbody, said centerbody face being flat and blunt immediately downstream of the wind turbine.

* * * * *